(12) United States Patent
Yamasaki et al.

(10) Patent No.: US 9,150,679 B2
(45) Date of Patent: Oct. 6, 2015

(54) SAPONIFICATION PRODUCT OF VINYL ESTER/ETHYLENICALLY UNSATURATED CARBOXYLIC ACID ESTER COPOLYMER AND PROCESS FOR PRODUCING THE SAME

(75) Inventors: Tomoaki Yamasaki, Himeji (JP); Yuji Kinpara, Himeji (JP); Shigeki Hamamoto, Himeji (JP)

(73) Assignee: SUMITOMO SEIKA CHEMICALS CO., LTD., Hyogo (JP)

( * ) Notice: Subject to any disclaimer, the term of this patent is extended or adjusted under 35 U.S.C. 154(b) by 82 days.

(21) Appl. No.: 14/117,417

(22) PCT Filed: May 1, 2012

(86) PCT No.: PCT/JP2012/061550
§ 371 (c)(1),
(2), (4) Date: Dec. 27, 2013

(87) PCT Pub. No.: WO2012/157450
PCT Pub. Date: Nov. 22, 2012

(65) Prior Publication Data
US 2015/0125697 A1    May 7, 2015

(30) Foreign Application Priority Data
May 17, 2011 (JP) ................... 2011-110483

(51) Int. Cl.
C08F 216/06 (2006.01)
C08J 3/12 (2006.01)

(52) U.S. Cl.
CPC .............. *C08F 216/06* (2013.01); *C08J 3/12* (2013.01); *C08J 2333/00* (2013.01)

(58) Field of Classification Search
CPC .......... C08F 8/00–8/50; C08F 216/00–216/38; C08F 220/00–220/70; C08J 3/00–3/28
USPC ................................................. 428/402, 407
See application file for complete search history.

(56) References Cited

U.S. PATENT DOCUMENTS

| | | | |
|---|---|---|---|
| 4,102,842 A | 7/1978 | Fujimoto et al. | |
| 4,155,893 A | 5/1979 | Fujimoto et al. | |
| 7,713,623 B2 * | 5/2010 | Matsuda et al. | 428/403 |

FOREIGN PATENT DOCUMENTS

| | | | |
|---|---|---|---|
| JP | 53-50290 A | | 5/1978 |
| JP | 63-186751 A | | 8/1988 |
| JP | 01-284507 A | | 11/1989 |
| JP | 06-206929 A | | 7/1994 |
| JP | 2009-57428 | * | 3/2009 |
| JP | 2009-057428 A | | 3/2009 |
| JP | WO2009/028559 | * | 3/2009 |
| JP | 2010-006872 A | | 1/2010 |
| JP | 2010-006873 A | | 1/2010 |
| JP | 2010-53222 | * | 3/2010 |
| JP | 2010-053222 A | | 3/2010 |

OTHER PUBLICATIONS

International Search Report dated Jun. 12, 2012, issued in corresponding application No. PCT/JP2012/061550.
Database WPI, Week 199434, Thomson Scientific, London, GB; AN 1994-275897 XP002729144, Cited in Extended European Search Report dated Sep. 10, 2014 (3 pages).
Extended European Search Report dated Sep. 10, 2014, issued in corresponding European Patent Application No. 12785016.2 (5 pages).
Notification of Transmittal of Translation of the International Preliminary Report on Patentability (Form PCT/IB/338) of International Application No. PCT/JP2012/061550, mailed on Nov. 28, 2013 with Forms PCT/IB/373, PCT/ISA/237, and PCT/IB/326.

* cited by examiner

*Primary Examiner* — Leszek Kiliman
(74) *Attorney, Agent, or Firm* — Westerman, Hattori, Daniels & Adrian, LLP

(57) ABSTRACT

The present invention provides a saponification product of a vinyl ester/ethylenically unsaturated carboxylic acid ester copolymer having superior tolerance of the aqueous thickening liquid against mechanical shear. More specifically, the present invention provides a saponification product of a vinyl ester/ethylenically unsaturated carboxylic acid ester copolymer having the superior tolerance, by polymerizing a mixture where the molar ratio of the vinyl ester/ethylenically unsaturated carboxylic acid ester is from 8/2 to 3/7, and saponifying the obtained copolymer in a mixed solvent where the mass composition ratio of an aqueous organic solvent/water mixture solvent is from 3/7 to 8/2.

17 Claims, No Drawings

SAPONIFICATION PRODUCT OF VINYL ESTER/ETHYLENICALLY UNSATURATED CARBOXYLIC ACID ESTER COPOLYMER AND PROCESS FOR PRODUCING THE SAME

TECHNICAL FIELD

The present invention relates to a saponification product of a vinyl ester/ethylenically unsaturated carboxylic acid ester copolymer and a process for producing the same.

BACKGROUND OF THE INVENTION

A saponification product of a vinyl ester/ethylenically unsaturated carboxylic acid ester copolymer has been used as a superabsorbent material and applied in a wide range of applications, for example, sanitary products such as disposable diapers and hygiene products and agricultural or horticultural products, due to its high absorbability and water retentivity. On the other hand, it has been used also as a thickening agent or a dispersion stabilizer for various paints and coating agents, due to the function that resin absorbs water to swell.

Patent Literature 1 discloses a process for producing water-insoluble hydrogel having high absorbability, characterized in that a copolymer composed of 20 to 80 mol % of a vinyl ester component and 80 to 20 mol % of an acrylate ester or methacrylate ester component is saponified in the presence of an alkali catalyst and a solvent and under conditions that the copolymer does not dissolve.

Patent Literature 2 discloses a process for producing a superabsorbent resin having an average particle size of 3 to 30 μm, which comprises homogenizing an aqueous dispersion system comprising monomers composed mainly of a vinyl ester and an ethylenically unsaturated carboxylic acid ester, a polymerization catalyst and additionally at least one selected from the group consisting of a dispersant agent and an anionic emulsifying agent, obtaining super fine polymer particles by polymerization, and saponifying them in the presence of an alkali and a dispersion medium.

Patent Literature 3 discloses a process for producing a liquidous absorbent resin by treating a saponification product of a copolymer of a vinyl ester and an ethylenically unsaturated carboxylic acid ester with an oxidation agent such as hydrogen peroxide.

CITATION LIST

Patent Literature

Patent Literature 1: JP S53-50290 A
Patent Literature 2: JP S63-186751 A
Patent Literature 3: JP H01-284507 A

DISCLOSURE OF INVENTION

Technical Problem

An aqueous thickening liquid, which is obtained by adding a commonly known saponification product of a vinyl ester/ethylenically unsaturated carboxylic acid ester copolymer into water and mixing together, has a problem that its viscosity greatly decreases by mechanical shear such as stirring. When it is used as a thickening agent or a dispersion stabilizer, it is often mixed at high speed, for example, by means of a homogenizing mixer, in adding an active substance or additive. A viscosity is changed by mechanical shear as above, and industrial production of end products having stable quality such as viscosity and dispersion stability becomes difficult.

Thus, a purpose of the present invention is to provide a saponification product of a vinyl ester/ethylenically unsaturated carboxylic acid ester copolymer which gives superior performance as a thickening agent, a dispersion stabilizer, or particularly a thickening agent for paints or various coating agents and a process for producing the same in order to solve the above-mentioned problem.

The present inventors have earnestly considered to find a saponification product of a vinyl ester/ethylenically unsaturated carboxylic acid ester copolymer having superior tolerance of an aqueous thickening liquid against mechanical shear, and finally have attained the present invention.

Means for Solving the Problem

The present inventors have found that a saponification product of a vinyl ester/ethylenically unsaturated carboxylic acid ester copolymer, which is obtained by saponifying a vinyl ester/ethylenically unsaturated carboxylic acid ester copolymer at a molar ratio in a specific range in an aqueous organic solvent/water mixture solvent at a mass ratio in a specific range in the presence of an alkali, exhibits a superior thickening effect and superior tolerance against mechanical shear.

The present invention relates to a saponification product of a vinyl ester/ethylenically unsaturated carboxylic acid ester copolymer having a viscosity retention of 70% or higher when a 1 mass %-aqueous solution is stirred for 20 minutes at 5 m/s of blade tip peripheral velocity.

The saponification product of a vinyl ester/ethylenically unsaturated carboxylic acid ester copolymer according to the present invention can be obtained by polymerizing monomers composed mainly of a vinyl ester and an ethylenically unsaturated carboxylic acid ester in the presence of a polymerization catalyst to obtain a vinyl ester/ethylenically unsaturated carboxylic acid ester copolymer, and saponifying the copolymer in the presence of an alkali in an aqueous organic solvent/water mixture solvent.

Examples of the vinyl ester include vinyl acetate and vinyl propionate. Vinyl acetate is preferable in view of its tendency to undergo a saponification reaction. These vinyl esters may be used alone or in combination of two or more of them.

Examples of the ethylenically unsaturated carboxylic acid ester include methyl ester, ethyl ester, n-propyl ester, iso-propyl ester, n-butyl ester and t-butyl ester of acrylic acid and methacrylic acid. Methyl acrylate and methyl methacrylate are preferable in view of their tendency to undergo a saponification reaction. These ethylenically unsaturated carboxylic acid esters may be used alone or in combination of two or more of them.

Copolymerization can be carried out with vinyl ester, other ethylenically unsaturated monomer which is copolymerizable with ethylenically unsaturated carboxylic acid ester, and a cross-linking agent.

In an embodiment of the saponification reaction according to the present invention, a saponification reaction where a vinyl acetate/methyl methacrylate copolymer was 100% saponified with KOH is shown below.

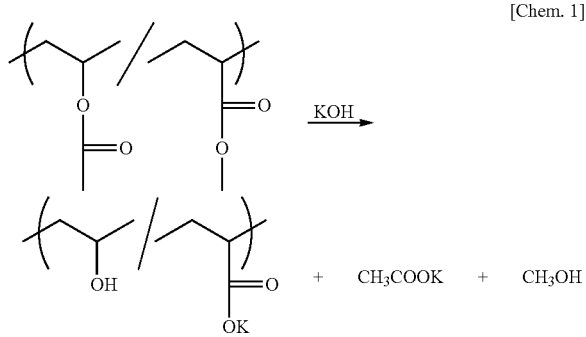

[Chem. 1]

The molar ratio of a vinyl ester and an ethylenically unsaturated carboxylic acid ester is preferably from 8/2 to 3/7, more preferably from 8/2 to 4/6, and further more preferably from 7/3 to 5/5. When the content of vinyl ester is more than a molar ratio of 8/2, a thickening effect may not be sufficient. When it is less than a molar ration of 3/7, upon using as thickening agent for a paint or a coating material, there are unpreferable cases because a dried coating layer becomes brittle.

As a vinyl ester/ethylenically unsaturated carboxylic acid ester copolymer, which is the precursor of the saponification product of a vinyl ester/ethylenically unsaturated carboxylic acid ester copolymer, in view that a copolymer can be obtained in a powdery form, preferably is that a copolymer can be obtained by a suspension polymerization to form a polymer particle in which the above-mentioned monomers are polymerized in a state that monomers mainly composed of vinyl ester and ethylenically unsaturated carboxylic acid ester disperse in an aqueous dispersant solution containing a polymerization catalyst.

Examples of the polymerization catalyst include organic peroxides such as benzoyl peroxide and lauryl peroxide, and azo compounds such as azobisisobutyronitrile and azobisdimethylvaleronitrile. In particular, lauryl peroxide is preferable.

The amount of the polymerization catalyst to be added is, based on the total mass of the monomers, preferably from 0.01 to 5 mass %, more preferably from 0.05 to 3 mass %, and further more preferably from 0.1 to 3 mass %.

When the amount is less than 0.01 mass %, the polymerization reaction may not be completed. When the amount is more than 5 mass %, the obtained saponification product of a vinyl ester/ethylenically unsaturated carboxylic acid ester copolymer may not sufficiently exhibit a thickening effect.

Examples of the dispersant agent, depending on the type and amount of the monomers to be used, specifically include water-soluble polymers such as polyvinyl alcohols (partially-saponified polyvinyl alcohols and fully-saponified polyvinyl alcohols), poly (meth)acrylic acid and salts thereof, polyvinylpyrrolidone, methyl cellulose, carboxymethyl cellulose, hydroxyethyl cellulose and hydroxypropyl cellulose, and water-insoluble inorganic compounds such as calcium phosphate and magnesium silicate. These dispersant agents may be used alone or in combination of two or more of them.

The amount of the dispersant agent to be used is, depending on the type of the monomers to be used, preferably from 0.01 to 10 mass %, and more preferably from 0.05 to 5 mass %, based on the total mass of the monomers.

Furthermore, water-soluble salts of alkali metals and/or alkali earth metals may be added in order to control a surfactant effect of the dispersant agent. Examples thereof include sodium chloride, potassium chloride, calcium chloride, lithium chloride, sodium sulfate, potassium sulfate, disodium hydrogenphosphate, dipotassium hydrogenphosphate, trisodium phosphate and tripotassium phosphate. These water-soluble salts may be used alone or in combination of two or more of them.

The amount of the water-soluble salt to be used is, depending on the type and amount of the dispersant agent to be used, usually from 0.01 to 10 mass %, based on the mass of the dispersant agent to be used.

The temperature in polymerizing monomers is preferably from $-20$ to $+20°$ C., and more preferably from $-10$ to $+10°$ C., for a 10-hr half-life temperature of a polymerization catalyst.

When the temperature is below $-20°$ C. for the 10-hr half-life temperature, the polymerization reaction may not be completed. When the temperature is above $+20°$ C. for the 10-hr half-life temperature, the obtained saponification product of a vinyl ester/ethylenically unsaturated carboxylic acid ester copolymer may not sufficiently exhibit a thickening effect.

The time to polymerize monomers is, depending on the type and amount of the polymerization catalyst to be used and the polymerization temperature, usually from a few hours to a few tens of hours.

The mass average particle size of the copolymer obtained by a suspension polymerization process can be controlled by changing a stirring rotation speed in suspending monomers in an aqueous dispersant solution, the type and amount of dispersant agents, molar ratio of monomers, polymerization temperature, a stirring rotation speed in polymerization and so on.

The mass average particle size of the copolymers is preferably from 10 to 500 μm, and more preferably from 10 to 400 μm. When the size is less than 10 μm, the reaction system may become too thick in saponification to be stirred. When the size is more than 500 μm, the saponification reaction may not be completed.

The mass average particle size can be determined by the following process.

100 g of a sample is weighed, and this is placed in an uppermost sieve of a standard sieve (wherein sieves having openings of 850 μm, 500 μm, 355 μm, 250 μm, 150 μm and 75 μm respectively and a bottom container are stacked in this order from above), and sifted by shaking for 10 minutes by use of a Ro-Tap sieve shaker, and subsequently fractions in each sieve are weighed. On the basis of the results, the particle size where the integrated mass is 50% is determined according to the following formula:

$$[\text{Mass Average Particle Size (μm)}]=[(50-A)/(C-A)]\times(D-B)+B \quad [\text{Math. 1}]$$

wherein

A is an integrated value (g) which is determined at the point where the integrated mass is less than 50 mass % and is the closest to 50 mass % in integrating the mass sequentially from the coarser fraction in the particle size distribution;

B is a sieve opening (μm) in determining the above integrated value;

C is an integrated value (g) which is determined at the point where the integrated mass is 50 mass % or more and is the closest to 50 mass % in integrating the mass sequentially from the coarser fraction in the particle size distribution; and D is a sieve opening (μm) in determining the above integrated value.

In the above-mentioned process, when the whole copolymers pass through a standard sieve with 150 μm opening, a volume average particle size is measured by means of a laser diffraction particle size analyzer (SALD-2000 from SHIMADZU Corporation) and the obtained measurement result is converted into a mass average particle size.

After a polymerization reaction is completed, the copolymer is obtained in the form of a water-containing cake by separation by means of, for example, centrifugation or filtration. The obtained copolymer in the form of water-containing cake can be saponified either directly or after dried, as needed. When drying the copolymer in the form of water-containing cake, it is usually dried at 100° C. or lower in order to prevent the particles from fusing.

As the alkali, the commonly known alkalis can be used. Alkali metal hydroxides are preferable, and sodium hydroxide and potassium hydroxide are particularly preferable in view of their high reactivity.

The amount of the alkali is, based on a molar number of monomers, preferably from 60 to 140 mol %, and more preferably from 80 to 120 mol %. When the amount is less than 60 mol %, the saponification may be insufficient. When the alkali is used more than 140 mol %, it is not economical because no further effect can be obtained.

Examples of the aqueous organic solvent include lower alcohols such as methanol, ethanol, n-propanol, isopropanol, n-butanol and t-butanol, ketones such as acetone and methyl ethyl ketone, and a mixture thereof. In particular, lower alcohols are preferable, and methanol and ethanol are particularly preferable in view that a saponification product of a vinyl ester/ethylenically unsaturated carboxylic acid ester copolymer exhibiting a superior thickening effect and superior tolerance against mechanical shear can be obtained.

The mass ratio of the aqueous organic solvent/water mixture solvent is preferably from 3/7 to 8/2, more preferably from 3/7 to 7/3, and further more preferably from 4/6 to 6/4. When the aqueous organic solvent is used less than a ratio of 3/7, the aqueous thickening liquid decreases its tolerance against mechanical shear, and furthermore, it is difficult to industrially produce the saponification product of the copolymer in view that the reaction system is significantly thick in saponification. When the aqueous organic solvent is used more than a ratio of 8/2, the obtained saponification product of the copolymer may decrease its transparency. In case that it is used as a thickening agent for a paint or a coating material, a dried coating layer may be whitened. In case that the copolymer in the form of water-containing cake is directly used in saponification reaction, the mass ratio of the aqueous organic solvent/water mixture solvent includes water in the copolymer in the form of water-containing cake.

Transparency of an aqueous thickening liquid can be assessed by charging a 1 mass %-aqueous thickening liquid of the saponification product of the copolymer into a cuvette having a light path length of 1 cm and measuring optical transmittance at a wave length of 425 nm by means of a spectrophotometer. The optical transmittance determined by the above-mentioned process is preferably 70% or higher, more preferably 80% or higher, and further more preferably 88% or higher.

When optical transmittance is lower than 70% in case that it is used as a thickening agent for a paint or a coating material, a dried coating layer may be whitened.

The temperature in saponifying a vinyl ester/ethylenically unsaturated carboxylic acid ester copolymer is, depending on the molar ratio of monomers, preferably from 20 to 60° C., and more preferably from 20 to 50° C. When saponification is carried out at a temperature lower than 20° C., the saponification reaction may not be completed. When it is carried out at a temperature higher than 60° C., the reaction system may become too thick to be stirred.

The time for a saponification reaction is, depending on the type and amount of the alkali to be used, usually a few hours.

Once the saponification reaction is completed, the saponification product of the copolymer generally becomes a dispersion in a paste or slurry form. A liquid-containing saponification product, which was obtained by solid-liquid separation in a conventionally known method, for example, centrifugation or filtration and sufficiently washing with lower alcohols such as methanol, is dried. Thereby, the saponification product of the copolymer can be obtained as spherical single particles or agglomerates resulting from aggregating spherical particles.

Although the condition in drying the liquid-containing saponification product of the copolymer is not especially limited, it is generally preferable to dry it under ordinary or reduced pressure at a temperature from 30 to 120° C.

The drying time is, depending on the pressure and temperature in drying, usually from a few hours to a few tens of hours.

The mass average particle size of the saponification product of the copolymer is preferably from 10 to 100 μm, and more preferably from 20 to 70 μm. When the size is less than 10 μm, the thickening effect is insufficient. When the size is more than 100 μm, the aqueous thickening liquid may become heterogeneous to decrease the thickening effect.

When the mass average particle size of the saponification product of the polymer obtained by drying the liquid-containing saponification product of the copolymer is more than 100 μm, the mass average particle size can be adjusted to from 10 to 100 μm by pulverization, for example, by a conventionally known pulverizing method such as jet mill method.

The mass average particle size of the saponification product of the copolymer can be determined by use of the previously-mentioned Ro-Tap sieve shaker. When the whole saponification products of the copolymers pass through a standard sieve with 150 μm opening in the same way as previously described, a volume average particle size is determined by means of a laser diffraction particle size analyzer (SALD-2000 from SHIMADZU Corporation) and the obtained measurement result is converted into a mass average particle size.

Due to the thickening effect of the saponification product of a vinyl ester/ethylenically unsaturated carboxylic acid ester copolymer, the 1 mass %-aqueous thickening liquid of the saponification product of the copolymer has a viscosity of preferably from 500 to 20,000 mPa·s, and more preferably from 1,000 to 10,000 mPa·s.

When the 1 mass %-aqueous thickening liquid of the saponification product of the copolymer has a viscosity of 500 mPa·s or lower, for example, in case that it is used as thickening agent for a paint or a coating material, since it is necessary to add a lot of the saponification product of the copolymer in order to obtain a desirable viscosity, a dried coating layer may become brittle. When the 1 mass %-aqueous thickening liquid of the saponification product of the copolymer has a viscosity higher than 20,000 mPa·s, since the thickening is too high, it is necessary to decrease the amount of the saponification product of the copolymer to be added. Then, the viscosity and dispersion stability of the obtained paint or coating material may decrease over time.

Viscosity of the 1 mass %-aqueous thickening liquid of the saponification product of the copolymer can be determined by means of a rotating viscometer (type: RVDV-I+) from BROOKFIELD and a spindle No. 5 at 50 rpm (liquid temperature: 25° C.)

Tolerance of the aqueous thickening liquid against mechanical shear can be evaluated, when the viscosity of the 1 mass %-aqueous thickening liquid obtained by a method for preparing a 1 mass %-aqueous thickening liquid as mentioned below is set to be 100%, as a viscosity retention after stirring for 20 minutes at 5 m/s of blade tip peripheral velocity. Blade tip peripheral velocity upon formulation is, depending on the type of end products and mixers, mostly about 5 m/s. The level preferably used for a thickening agent or a dispersion stabilizer is a viscosity retention of 70% or higher, more preferably 80% or higher, and further more preferably 88% or higher according to the above-mentioned evaluation. In determining the viscosity retention, viscosity is measured by means of a rotating viscometer (type: RVDV-I+) from BROOKFIELD and a spindle No. 5 at 50 rpm (liquid temperature: 25° C.). Viscosity may be measured within 12 hours after storing the saponification product at room temperature. Preferably, viscosity is measured immediately after stirring.

When a viscosity retention is lower than 70%, it is difficult to obtain the end products with stable quality because the viscosity greatly changes in the course of adding an active substance, additive and so on and mixing together at high speed with a homogenizing mixer. For example, the viscosity and dispersion stability of the end products vary every batch. Furthermore, it is necessary to increase the amount of the saponification product of the copolymer in order to improve the thickening effect and dispersion stability. As a result, the end product often decreases its quality and performance.

Effects of the Invention

The present invention can provide a saponification product of a vinyl ester/ethylenically unsaturated carboxylic acid ester copolymer having superior tolerance of the aqueous thickening liquid against mechanical shear.

MODE FOR CARRYING OUT THE INVENTION

While the present invention is explained in more detail below by referring to examples, the present invention is not limited to these examples.

Example 1

(1) Preparation of a Vinyl Acetate/Methyl Acrylate Copolymer 768 g of water and 12 g of anhydrous sodium sulfate were charged in a 2 L reactor equipped with a stirrer, a thermometer, a $N_2$ gas introduction pipe, a reflux condenser and a dropping funnel, and the interior was purged with $N_2$ gas for deoxidation. Subsequently, 1 g of a partially saponified polyvinyl alcohol (saponification degree: 88%) and 1 g of lauryl peroxide were charged and the inside temperature was elevated to 60° C. After that, monomers consisting of 104 g (1.209 mol) of methyl acrylate and 155 g (1.802 mol) of vinyl acetate were dropped through a dropping funnel over 4 hours. In the course of dropping polymerization, the inside temperature was kept at 60° C. with a stirring rotation speed of 600 rpm. After the dropping polymerization was completed, the inside temperature was kept for 2 hours at 65° C. Subsequently, dehydration was carried out by centrifugation. As a result, 288 g of a vinyl acetate/methyl acrylate copolymer (water content: 10.4%) was obtained. The vinyl acetate/methyl acrylate copolymer had a mass average particle size of 180 μm.

(2) Saponification of the Vinyl Acetate/Methyl Acrylate Copolymer 450 g of methanol, 420 g of water, 132 g (3.3 mol) of sodium hydroxide and 288 g of the obtained water-containing copolymer (water content: 10.4%) were charged in the same reactor as described above, and a saponification reaction was carried out for 3 hours with stirring at 400 rpm at 30° C. After the saponification reaction is completed, the obtained saponification product of the copolymer was washed with 600 g of methanol three times, filtered, and dried for 6 hours at 70° C. As a result, 193 g of a saponification product of the vinyl acetate/methyl acrylate copolymer was obtained. The saponification product of the vinyl acetate/methyl acrylate copolymer had a mass average particle size of 180 μm.

(3) Pulverization of the Saponification Product of a Vinyl Acetate/Methyl Acrylate Copolymer 193 g of the saponification product of a vinyl acetate/methyl acrylate copolymer was pulverized by means of a jet mill (LJ from NIPPON PNEUMATIC MFG. CO., LTD.) so that 173 g of the saponification product of a vinyl acetate/methyl acrylate copolymer in the form of fine particles was obtained. The particle size of the obtained saponification product of the copolymer was measured by means of a laser diffraction particle size analyzer (SALD-2000 from SHIMADZU Corporation). The obtained volume average particle size was converted into a mass average particle size. The mass average particle size was 55 μm.

In addition, the aqueous thickening liquid obtained by the process mentioned below for preparing a 1 mass %-aqueous thickening liquid had an optical transmittance of 90%.

Example 2

173 g of a saponification product of a vinyl acetate/methyl acrylate copolymer in the form of fine particles was prepared in the same manner as in Example 1, except that 602 g of methanol and 228 g of water were used in saponifying a vinyl acetate/methyl acrylate copolymer. The particle size of the obtained saponification product of the copolymer was measured in the same manner as in Example 1. The mass average particle size was 77 μm and the optical transmittance was 84%.

Example 3

160 g of a saponification product of a vinyl acetate/methyl acrylate copolymer in the form of fine particles was prepared in the same manner as in Example 1, except that 78 g (0.907 mol) of methyl acrylate and 181 g (2.105 mol) of vinyl acetate were used in polymerization for preparing a vinyl acetate/methyl acrylate copolymer and that 368 g of methanol and 523 g of water were used in saponifying a vinyl acetate/methyl acrylate copolymer. The particle size of the obtained saponification product of the copolymer was measured in the same manner as in Example 1. The mass average particle size was 50 μm and the optical transmittance was 92%.

Example 4

147 g of a saponification product of a vinyl acetate/methyl acrylate copolymer in the form of fine particles was prepared in the same manner as in Example 1, except that 52 g (0.605 mol) of methyl acrylate and 207 g (2.407 mol) of vinyl acetate were used in polymerization for preparing a vinyl acetate/ methyl acrylate copolymer and that 283 g of methanol and 630 g of water were used in saponifying a vinyl acetate/methyl acrylate copolymer. The particle size of the obtained saponification product of the copolymer was measured in the same manner as in Example 1. The mass average particle size was 13 μm and the optical transmittance was 93%.

Example 5

201 g of a saponification product of a vinyl acetate/methyl acrylate copolymer in the form of fine particles was prepared in the same manner as in Example 1, except that 155 g (1.802 mol) of methyl acrylate and 104 g (1.209 mol) of vinyl acetate were used in polymerization for preparing a vinyl acetate/methyl acrylate copolymer. The particle size of the obtained saponification product of the copolymer was measured in the same manner as in Example 1. The mass average particle size was 52 μm and the optical transmittance was 92%.

Example 6

201 g of a saponification product of a vinyl acetate/methyl acrylate copolymer in the form of fine particles was prepared in the same manner as in Example 5, except that 602 g of methanol and 228 g of water were used in saponifying a vinyl acetate/methyl acrylate copolymer. The particle size of the obtained saponification product of the copolymer was measured in the same manner as in Example 1. The mass average particle size was 50 μm and the optical transmittance was 86%.

Example 7

214 g of a saponification product of a vinyl acetate/methyl acrylate copolymer in the form of fine particles was prepared in the same manner as in Example 3, except that 181 g (2.105 mol) of methyl acrylate and 78 g (0.907 mol) of vinyl acetate were used in polymerization for preparing a vinyl acetate/methyl acrylate copolymer. The particle size of the obtained saponification product of the copolymer was measured in the same manner as in Example 1. The mass average particle size was 46 μm and the optical transmittance was 92%.

Example 8

173 g of a saponification product of a vinyl acetate/methyl acrylate copolymer in the form of fine particles was prepared in the same manner as in Example 1, except that 673 g of methanol and 138 g of water were used in saponifying a vinyl acetate/methyl acrylate copolymer. The particle size of the obtained saponification product of the copolymer was measured in the same manner as in Example 1. The mass average particle size was 50 μm and the optical transmittance was 75%.

Example 9

147 g of a saponification product of a vinyl acetate/methyl acrylate copolymer in the form of fine particles was prepared in the same manner as in Example 1, except that 52 g (0.605 mol) of methyl acrylate and 207 g (2.407 mol) of vinyl acetate were used in preparing a vinyl acetate/methyl acrylate copolymer and that 673 g of methanol and 138 g of water were used in saponifying a vinyl acetate/methyl acrylate copolymer. The particle size of the obtained saponification product of the copolymer was measured in the same manner as in Example 1. The mass average particle size was 52 μm and the optical transmittance was 75%.

Example 10

214 g of a saponification product of a vinyl acetate/methyl acrylate copolymer in the form of fine particles was prepared in the same manner as in Example 10, except that 181 g (2.105 mol) of methyl acrylate and 78 g (0.907 mol) of vinyl acetate were used in preparing a vinyl acetate/methyl acrylate copolymer. The particle size of the obtained saponification product of the copolymer was measured in the same manner as in Example 1. The mass average particle size was 86 μm and the optical transmittance was 78%.

Example 11

173 g of a saponification product of a vinyl acetate/methyl acrylate copolymer in the form of fine particles was prepared in the same manner as in Example 1, except that 528 g of methanol and 322 g of water were used in saponifying a vinyl acetate/methyl acrylate copolymer. The particle size of the obtained saponification product of the copolymer was measured in the same manner as in Example 1. The mass average particle size was 70 μm and the optical transmittance was 88%.

Example 12

160 g of a saponification product of a vinyl acetate/methyl acrylate copolymer in the form of fine particles was prepared in the same manner as in Example 1, except that 129 g (1.5 mol) of methyl acrylate and 129 g (1.5 mol) of vinyl acetate were used in polymerization for preparing a vinyl acetate/methyl acrylate copolymer and that 368 g of methanol and 523 g of water were used in saponifying a vinyl acetate/methyl acrylate copolymer. The particle size of the obtained saponification product of the copolymer was measured in the same manner as in Example 1. The mass average particle size was 50 μm and the optical transmittance was 93%.

Comparative Example 1

133 g of a saponification product of a vinyl acetate/methyl acrylate copolymer in the form of fine particles was prepared in the same manner as in Example 1, except that 26 g (0.303 mol) of methyl acrylate and 233 g (2.709 mol) of vinyl acetate were used in polymerization for preparing a vinyl acetate/methyl acrylate copolymer and that 194 g of methanol and 743 g of water were used in saponifying a vinyl acetate/methyl acrylate copolymer. However, the reaction system became too thick in saponification to be stirred. The particle size of the obtained saponification product of the copolymer was measured in the same manner as in Example 1. The mass average particle size was 55 μm and the optical transmittance was 92%.

Comparative Example 2

200 g of a saponification product of a vinyl acetate/methyl acrylate copolymer in the form of fine particles was prepared in the same manner as in Comparative Example 1, except that 155 g (1.802 mol) of methyl acrylate and 104 g (1.209 mol) of vinyl acetate were used in polymerization for preparing a vinyl acetate/methyl acrylate copolymer. However, the reaction system became too thick in saponification to be stirred. The particle size of the obtained saponification product of the copolymer was measured in the same manner as in Example 1. The mass average particle size was 55 μm and the optical transmittance was 92%.

Comparative Example 3

133 g of a saponification product of a vinyl acetate/methyl acrylate copolymer in the form of fine particles was prepared in the same manner as in Example 1, except that 26 g (0.303 mol) of methyl acrylate and 233 g (2.709 mol) of vinyl acetate were used in polymerization for preparing a vinyl acetate/methyl acrylate copolymer. The particle size of the obtained saponification product of the copolymer was measured in the same manner as in Example 1. The mass average particle size was 55 μm and the optical transmittance was 89%.

<Evaluations>

Measurements were taken of the viscosities of the 1 mass %-aqueous thickening liquid and the viscosity retentions after stirring for 20 minutes at 5 m/s of blade tip peripheral velocity in respect to the saponification products of the vinyl acetate/methyl acrylate copolymers in the form of fine particles obtained in Examples and Comparative Examples. The results were shown in Table 1.

(1) Preparation of a 1 Mass %-Aqueous Thickening Liquid and Viscosity Measurement 198 g of water is charged in a 200 ml beaker, and 2 g of a saponification product of a vinyl acetate/methyl acrylate copolymer in the form of fine particles is added with stirring by means of a jar tester (type: MJS-10H from MIYAMOTO Corporation). The stirring is carried out for 5 hours at a stirring rotation speed of 400 rpm (stirring blade diameter: 50 mm). After the obtained 1 mass %-aqueous thickening liquid is put in a thermostatic bath so that the liquid temperature is 25° C., viscosity is measured by means of a rotating viscometer (type: RVDV-I+ from BROOKFIELD) and a spindle No. 5 at 50 rpm.

(2) Measurement of a Viscosity Retention of an Aqueous Thickening Liquid

After 200 g of the 1 mass %-aqueous thickening liquid prepared by the above-mentioned process is stirred for 20 minutes at a stirring rotation speed of 3,200 rpm (blade tip peripheral velocity: 5 m/s) by means of a homogenizing mixer (T.K HOMO MIXER MARK II from PRIMIX Corporation, stirring blade diameter: 30 mm), the liquid is put in a thermostatic bath so that the liquid temperature is 25° C. Subsequently, viscosity is measured by means of a rotating viscometer (type: RVDV-1+ from BROOKFIELD) and a spindle No. 5 at 50 rpm. A viscosity retention is determined according to the following calculating formula.

Viscosity Retention [%]=(Viscosity after stirring by means of a homogenizing mixer)/(Viscosity before stirring by means of a homogenizing mixer)×100    [Math. 2]

TABLE 1

|  | Viscosity of a 1 mass %-aqueous thickening liquid [mP · s] | | Viscosity Retention |
| --- | --- | --- | --- |
|  | Before stirring | After stirring | [%] |
| Example 1 | 1220 | 1120 | 92 |
| Example 2 | 2500 | 2380 | 95 |
| Example 3 | 920 | 820 | 89 |
| Example 4 | 620 | 440 | 71 |
| Example 5 | 4100 | 3530 | 86 |
| Example 6 | 6400 | 5900 | 92 |

TABLE 1-continued

|  | Viscosity of a 1 mass %-aqueous thickening liquid [mP · s] | | Viscosity Retention |
| --- | --- | --- | --- |
|  | Before stirring | After stirring | [%] |
| Example 7 | 6100 | 5000 | 82 |
| Example 8 | 4300 | 4050 | 94 |
| Example 9 | 1190 | 950 | 80 |
| Example 10 | 6900 | 6490 | 94 |
| Example 11 | 1760 | 1640 | 93 |
| Example 12 | 1760 | 1640 | 93 |
| Comparative Example 1 | 200 | 100 | 50 |
| Comparative Example 2 | 980 | 430 | 44 |
| Comparative Example 3 | 400 | 190 | 48 |

The saponification product of a vinyl ester/ethylenically unsaturated carboxylic acid ester copolymer, which was obtained by saponifying a vinyl ester/ethylenically unsaturated carboxylic acid ester copolymer at a molar ratio in a specific range which was from 8/2 to 3/7 with an aqueous organic solvent/water mixture solvent at a mass ratio in a specific range which was from 3/7 to 8/2 in the presence of an alkali, exhibited a superior thickening effect and superior tolerance of the aqueous thickening liquid against mechanical shear. Furthermore, it never became significantly thick in saponification and when it was used as thickening agent for a paint or a coating material, a dried coating layer never became brittle or whitened.

INDUSTRIAL APPLICABILITY

The present invention can provide a saponification product of a vinyl ester/ethylenically unsaturated carboxylic acid ester copolymer which shows superior performance as a thickening agent, a dispersion stabilizer, or particularly a thickening agent for paints or various coating materials and a process for producing the same.

What is claimed is:

1. A saponification product of a vinyl ester/ethylenically unsaturated carboxylic acid ester copolymer having a viscosity retention of 70% or higher when a 1 mass %-aqueous thickening liquid is stirred for 20 minutes at 5 m/s of blade tip peripheral velocity, and a mass average particle size from 10 to 100 μm.

2. The saponification product of a vinyl ester/ethylenically unsaturated carboxylic acid ester copolymer according to claim 1, wherein the viscosity of 1 mass %-aqueous thickening liquid is from 500 to 20,000 mPa·s.

3. The saponification product of a vinyl ester/ethylenically unsaturated carboxylic acid ester copolymer according to claim 1, wherein the molar ratio of the vinyl ester/ethylenically unsaturated carboxylic acid ester is from 8/2 to 3/7.

4. The saponification product of a vinyl ester/ethylenically unsaturated carboxylic acid ester copolymer according to claim 1, wherein the vinyl ester is vinyl acetate or vinyl propionate.

5. The saponification product of a vinyl ester/ethylenically unsaturated carboxylic acid ester copolymer according to claim 1, wherein the ethylenically unsaturated carboxylic acid ester is methyl acrylate or methyl methacrylate.

6. A process for producing a saponification product of a vinyl ester/ethylenically unsaturated carboxylic acid ester copolymer having a viscosity retention of 70% or higher when a 1 mass %-aqueous thickening liquid is stirred for 20 minutes at 5 m/s of blade tip peripheral velocity, characterized in that the process comprises a polymerization step of polymerizing monomers composed mainly of vinyl ester and ethylenically unsaturated carboxylic acid ester in a suspended form in an aqueous dispersant solution comprising a polymerization catalyst to obtain polymer particles;

a saponification step of saponifying the polymer particles in an aqueous organic solvent/water mixture solvent in the presence of an alkali to obtain the saponification product of the copolymer, wherein, in the polymerization step, the molar ratio of the vinyl ester/ethylenically unsaturated carboxylic acid ester in the monomers is from 8/2 to 3/7, wherein, in the saponification step, the mass composition ratio of the aqueous organic solvent/water mixture solvent is from 3/7 to 8/2, and a pulverization step of pulverizing the saponification product to make indefinite particles having a mass average particle size from 10 to 100 μm.

7. A saponification product of a vinyl ester/ethylenically unsaturated carboxylic acid ester copolymer produced by the process for producing a saponification product of a vinyl ester/ethylenically unsaturated carboxylic acid ester copolymer according to claim 6.

8. The saponification product of a vinyl ester/ethylenically unsaturated carboxylic acid ester copolymer according to claim 2, wherein the molar ratio of the vinyl ester/ethylenically unsaturated carboxylic acid ester is from 8/2 to 3/7.

9. The saponification product of a vinyl ester/ethylenically unsaturated carboxylic acid ester copolymer according to claim 2, wherein the vinyl ester is vinyl acetate or vinyl propionate.

10. The saponification product of a vinyl ester/ethylenically unsaturated carboxylic acid ester copolymer according to claim 3, wherein the vinyl ester is vinyl acetate or vinyl propionate.

11. The saponification product of a vinyl ester/ethylenically unsaturated carboxylic acid ester copolymer according to claim 2, wherein the ethylenically unsaturated carboxylic acid ester is methyl acrylate or methyl methacrylate.

12. The saponification product of a vinyl ester/ethylenically unsaturated carboxylic acid ester copolymer according to claim 3, wherein the ethylenically unsaturated carboxylic acid ester is methyl acrylate or methyl methacrylate.

13. The saponification product of a vinyl ester/ethylenically unsaturated carboxylic acid ester copolymer according to claim 4, wherein the ethylenically unsaturated carboxylic acid ester is methyl acrylate or methyl methacrylate.

14. The saponification product of a vinyl ester/ethylenically unsaturated carboxylic acid ester copolymer according to claim 2, which has a mass average particle size from 10 to 100 μm.

15. The saponification product of a vinyl ester/ethylenically unsaturated carboxylic acid ester copolymer according to claim 3, which has a mass average particle size from 10 to 100 μm.

16. The saponification product of a vinyl ester/ethylenically unsaturated carboxylic acid ester copolymer according to claim 4, which has a mass average particle size from 10 to 100 μm.

17. The saponification product of a vinyl ester/ethylenically unsaturated carboxylic acid ester copolymer according to claim 5, which has a mass average particle size from 10 to 100 μm.

* * * * *